US012762070B2

(12) United States Patent
Ayyapureddi et al.

(10) Patent No.: US 12,762,070 B2
(45) Date of Patent: Oct. 13, 2026

(54) HBM BASE DIE WITH 2.5D AND 3D PHY INTERFACE

(71) Applicant: Micron Technology, Inc., Boise, ID (US)

(72) Inventors: Sujeet Ayyapureddi, Boise, ID (US); Lingming Yang, Meridian, ID (US); Raymond Wei-tang Chang, Sacramento, CA (US); Raghukiran Sreeramaneni, Purchase, NY (US); Dong Uk Lee, Suwanee, GA (US); Nevil N. Gajera, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/951,103

(22) Filed: Nov. 18, 2024

(65) Prior Publication Data

US 2025/0231889 A1 Jul. 17, 2025

Related U.S. Application Data

(60) Provisional application No. 63/621,320, filed on Jan. 16, 2024.

(51) Int. Cl.
*G06F 13/16* (2006.01)

(52) U.S. Cl.
CPC .......... *G06F 13/16* (2013.01); *G06F 2213/16* (2013.01)

(58) Field of Classification Search
None
See application file for complete search history.

(56) References Cited

U.S. PATENT DOCUMENTS

| | | | | |
|---|---|---|---|---|
| 10,678,716 | B2 | 6/2020 | Park et al. | |
| 11,397,687 | B2 | 7/2022 | Malladi et al. | |
| 11,791,325 | B2 | 10/2023 | Baek | |
| 2016/0364345 | A1 * | 12/2016 | Jeter | G06F 12/023 |
| 2021/0257338 | A1 | 8/2021 | Keeth | |
| 2022/0415379 | A1 | 12/2022 | Biswas et al. | |
| 2024/0196633 | A1 * | 6/2024 | Yang | H10B 80/00 |

OTHER PUBLICATIONS

U.S. Appl. No. 18/951,078, filed Nov. 18, 2024, Sujeet Ayyapureddi.

* cited by examiner

*Primary Examiner* — Scott C Sun
(74) *Attorney, Agent, or Firm* — Fletcher Yoder, P.C.

(57) ABSTRACT

Systems and methods are provided for using a 2.5D PHY and a 3D PHY for communications between a memory device and a host device. The memory device includes a 2.5D PHY for communications with the host device through a predefined communication interface and a 3D PHY for communications with the host device through a customized communication interface. The 2.5D PHY of the memory device is used for communications through the predefined communication interface when the customized communication interface is not available or undesired (e.g., during testing of the memory device).

21 Claims, 6 Drawing Sheets

HBM BASE DIE WITH 2.5D AND 3D PHY INTERFACE

CROSS-REFERENCE TO RELATED APPLICATIONS

This application claims priority to U.S. Provisional Application No. 63/621,320, filed Jan. 16, 2024, which is incorporated by reference herein in its entirety.

BACKGROUND OF THE INVENTION

Field of the Invention

The present disclosure relates generally to the field of semiconductor memory devices. More specifically, embodiments of the present disclosure relate to interface circuitry of a memory device.

Description of the Related Art

A memory device may include a number of dies, and each die may include a number of memory arrays and peripheral circuitry thereon, such as die logic or a die processor. The memory device may be a high bandwidth memory (HBM) device, which may include an interface die (or base die) and one or more core dies stacked on the interface die. The interface die includes interface circuitry to communicate with a host device through a communication interface. The memory device may receive commands or operations from the host device through the communication interface, such as read or write operations to transfer data (e.g., user data and associated integrity data, such as error data or address data, etc.) between the memory device and the host device, erase operations to erase data from the memory device, or drive management operations (e.g., data migration, garbage collection, block retirement), etc. Generally, the host device may use a predefined communication interface for communication with the memory devices. It may be desirable to use a customized communication interface for the communication between the host device and the memory device. However, it may be difficult for the memory device to have an interface adaptable to the customized communication interface. For example, it might be difficult to design and/or test the interface since designing and/or testing the interface involves designing the customized communication interface or coupling the customized communication interface for testing, which might be difficult or undesired (e.g., the customized communication interface might be unavailable for testing).

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
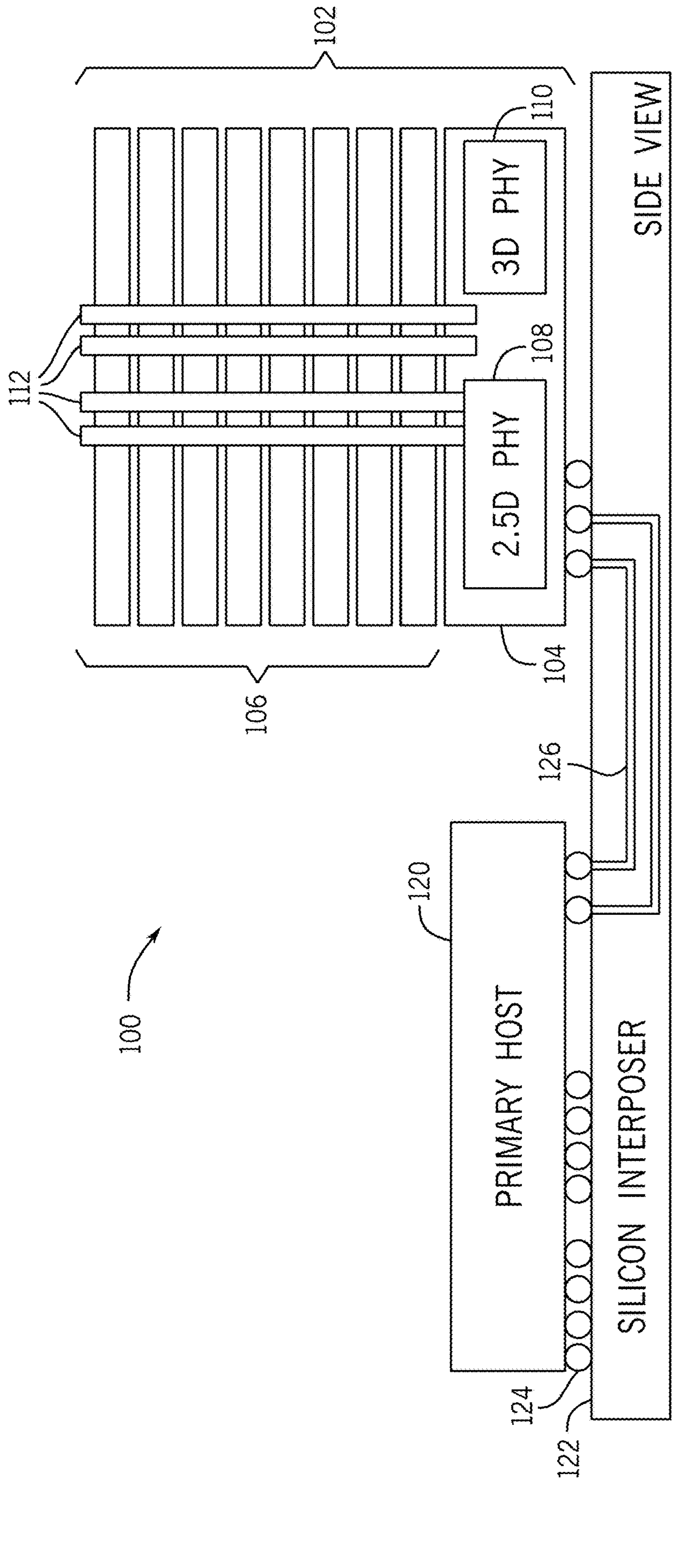
FIG. 1 is a cross-section of an embodiment of a system including a memory device and a host device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As mentioned previously, a memory device may be a high bandwidth memory (HBM) device, which may include an interface die (or base die) and one or more dies stacked on the interface die to form a vertically stacked three-dimensional (3D) HBM cube. The interface die includes a physical interface (PHY) to communicate with a host device through a communication interface. The interface die also includes circuitry to communicate with the other dies of the HBM device. In some embodiments, the host device may use a predefined communication interface having a predetermined configuration to communicate with the memory device, and the interface die of the memory device may include a predefined PHY that is adaptable to the predefined communication interface. In the above embodiment, the predefined PHY may be a two-and-half dimensional (2.5D) PHY, meaning that the host device may only be able to communicate with the memory device using the predetermined configuration of the communication interface.

In some embodiments, it may be desirable for the host device to use a customized communication interface to communicate with the memory device. For example, the host device may utilize the silicon area under the HBM device to offload some circuits from the host device by using a customized communication interface to communicate with the memory device. In order to use the customized communication interface, the interface die of the memory device may include a customized three-dimensional (3D) PHY that is adaptable to the customized communication interface. Therefore, the interface die of the memory device may include circuitry to support functions of both the memory device and the host device.

Accordingly, the present disclosure is directed to apparatuses, systems and methods for using a 2.5D PHY and a 3D PHY for communications between a memory device and a host device. The memory device may include a 2.5D PHY for communications with the host device through a predefined communication interface and a 3D PHY for communications with the host device through a customized communication interface. In addition, the 2.5D PHY of the memory device may be used for communications through the predefined communication interface when the customized communication interface is not available or undesired (e.g., during testing of the memory device).

Turning now to the figures, FIG. 1 is a cross-section of a system 100 including a memory device and a host device according to an embodiment of the present disclosure. Although one memory device is shown for the depicted example, a number of memory devices greater than one may be used. A memory device 102, as shown in the embodiment of FIG. 1, may be a high bandwidth memory (HBM) device (e.g., HBM cube), which includes an interface die (or base die) 104 and one or more memory dies 106 stacked on the interface die 104. The interface die 104 may include a 2.5D PHY 108 (e.g., a predefined interface) and a 3D PHY 110 (e.g., a customized interface). The memory device 102 may include one or more Through-Wafer Interconnects (TWIs) 112 (if the integrated circuits are silicon-based, these may also be known as Through-Silicon Vias (TSVs)) to couple the interface die 104 and the dies 106.

The system 100 may include a primary host device 120. The primary host device 120 and the memory device 102 may be coupled to an interposer 122 (e.g., a silicon interposer) via a number of micro-bumps 124. The interposer 122 may include channels 126, which may be used to communicatively couple the primary host device 120 with the memory device 102 via corresponding micro-bumps 124. Although only two channels 126 are shown in FIG. 1, greater or fewer numbers of channels 126 may be used.

In an embodiment, the primary host device 120 may be coupled to the 2.5D PHY 108 of the interface die 104 via a predefined communication interface, as illustrated in FIG. 1. In another embodiment, the primary host device 120 may be coupled directly or indirectly (e.g., via a secondary host) to the 3D PHY 110 of the interface die 104 via a customized communication interface, as will be described and illustrated with regard to FIG. 5 and FIG. 6. The memory device 102 may receive commands or operations from the primary host device 120 through the channels 126, such as read or write operations to transfer data (e.g., user data and associated integrity data, such as error data or address data, etc.) between the memory device 102 and the primary host device 120, erase operations to erase data from the memory device 102, or drive management operations (e.g., data migration, garbage collection, block retirement), etc. In the embodiment illustrated in FIG. 1, the 2.5D PHY 108 of the interface die 104 may be used for testing the memory device 102.

Figure 2:
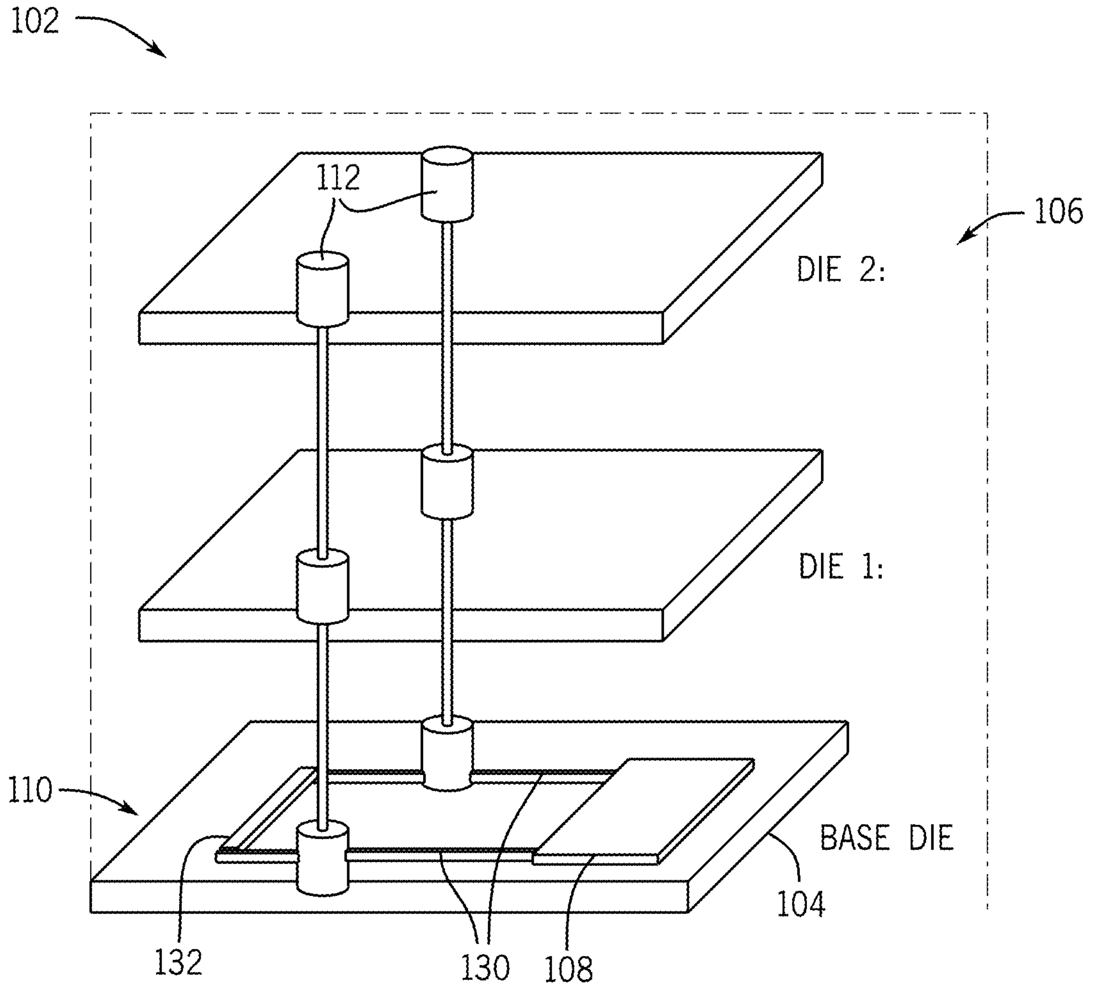
FIG. 2 is a simplified block diagram showing a perspective view of a portion of the memory device of FIG. 1, according to an embodiment of the present disclosure.
Figure 3:
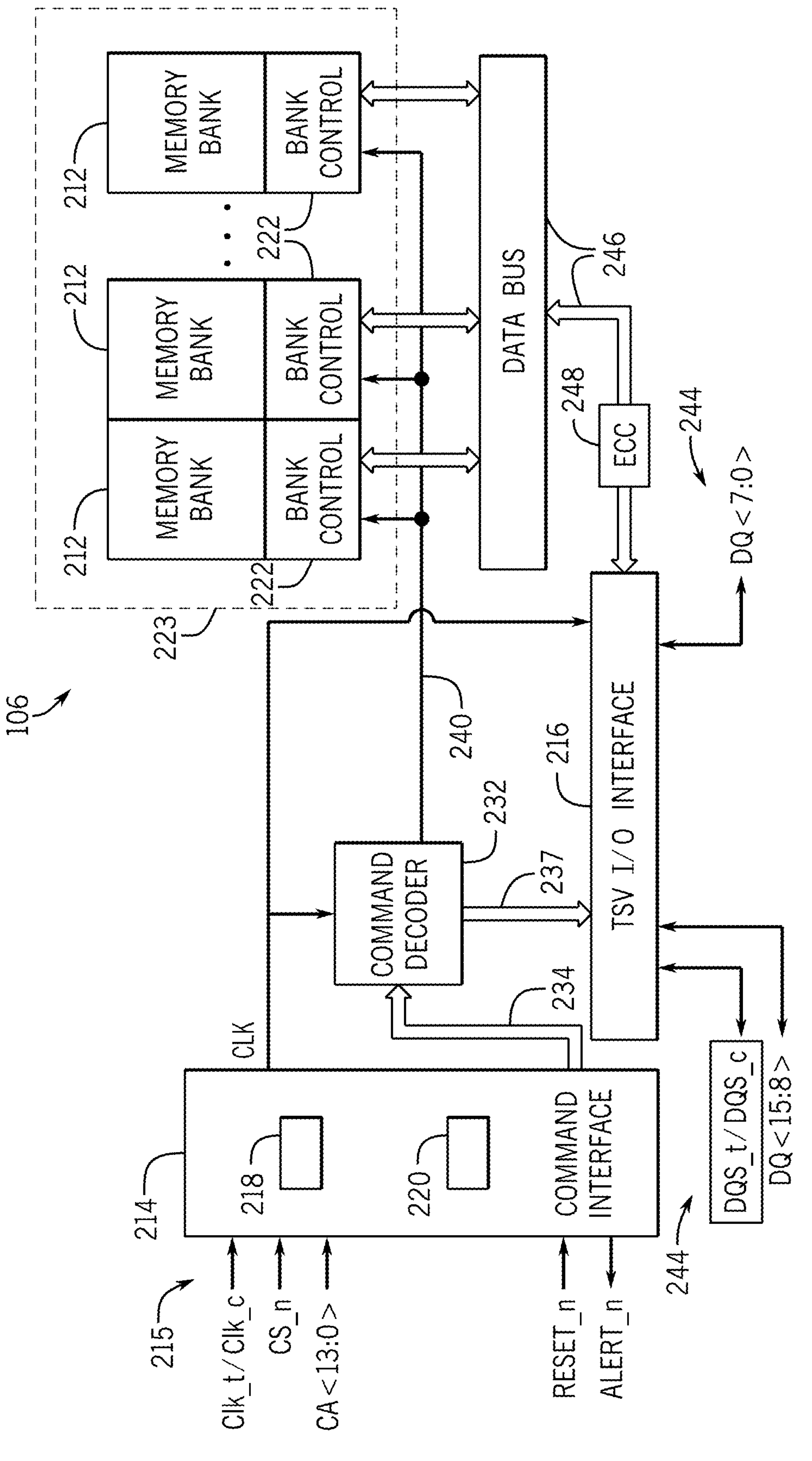
FIG. 3 is a simplified block diagram illustrating certain features of the memory device of FIG. 1, according to an embodiment of the present disclosure.

FIG. 2 is a simplified block diagram showing a perspective view of a portion of the memory device 102. As illustrated in FIG. 2, the 2.5D PHY 108 of the interface die 104 may be communicatively coupled to the TWIs 112 via channels 130. Although only two channels 130 are shown in FIG. 2, greater or fewer numbers of channels 130 may be used. In one embodiment, commands or operations from the primary host device 120 may be transmitted to the memory device 102 via the 2.5D PHY 108, such as read or write operations to transfer data (e.g., user data and associated integrity data, such as error data or address data, etc.), erase operations to erase data, or drive management operations (e.g., data migration, garbage collection, block retirement), etc. The commands or operations received by the 2.5D PHY 108 may be transmitted to the dies 106 via the channels 130 and the TWIs 112. Each of the dies 106 (e.g., die 1, die 2 . . . ) may include interface circuitry to communicate with the interface die 104, as illustrated in FIG. 3. Corresponding data may be transmitted between the dies 106 and the 2.5D PHY via the TWIs 112 and the channels 130, and the corresponding data may be transmitted between the primary host device 120 and the memory device 102 via the 2.5D PHY.

The 3D PHY 110 of the interface die 104 may be communicatively coupled to the TWIs 112 via DRAM Interface Fabric (DIFF) 132. In another embodiment, commands or operations from the primary host device 120 may be transmitted to the memory device 102 via the 3D PHY 110, such as read or write operations to transfer data (e.g., user data and associated integrity data, such as error data or address data, etc.), erase operations to erase data, or drive management operations (e.g., data migration, garbage collection, block retirement), etc. The commands or operations received by the 3D PHY 110 may be transmitted to the dies 106 via the DIFF 132 and the TWIs 112. As mentioned above, each of the dies 106 (e.g., die 1, die 2 . . . ) may include interface circuitry to communicate with the interface die 104, as illustrated in FIG. 3. Corresponding data may be transmitted between the dies 106 and the 3D PHY 110 via the TWIs 112 and the DIFF 132, and the corresponding data may be transmitted between the primary host device 120 and the memory device 102 via the 3D PHY 110. Accordingly, both the 2.5D PHY 108 and the 3D PHY 110 on the interface die 104 may be communicatively coupled to the TWIs 112, which are used to couple the interface die 104 and the dies 106 (e.g., die 1, die 2 . . . ) of the memory device 102.

FIG. 3 is a simplified block diagram illustrating certain features of the dies 106 of the memory device 102. Specifically, the block diagram of FIG. 3 is a functional block diagram illustrating certain functionality of the dies 106. In accordance with one embodiment, the dies 106 may be a dynamic random access memory (DRAM).

Each of the dies 106 may include a number of memory banks 212. The memory banks 212 may be DRAM memory banks, for instance. Each of the dies 106 may include a command interface 214 and a TWI interface, such as a TSV input/output (I/O) interface 216, to exchange (e.g., receive and transmit) signals with the interface die 104 (e.g., via the TWIs 112). The command interface 214 may receive a number of signals (e.g., signals 215) from the interface die 104. The interface die 104 may provide various signals 215 to the dies 106 to facilitate the transmission and receipt of data to be written to or read from the dies 106.

As will be appreciated, the command interface 214 may include a number of circuits, such as a clock input circuit 218 and a command/address input circuit 220, for instance, to ensure proper handling of the signals 215. The command interface 214 may receive one or more clock signals from the interface die 104. Generally, HBM memory utilizes a differential pair of system clock signals, referred to herein as the true clock signal (Clk_t) and the complementary clock signal (Clk_c). The positive clock edge for HBM refers to the point where the rising true clock signal Clk_t crosses the falling complementary clock signal Clk_c, while the negative clock edge indicates that transition of the falling true clock signal Clk_t and the rising of the complementary clock signal Clk_c. Commands (e.g., read command, write command, etc.) are typically entered on the positive edges of the clock signal and data is transmitted or received on both the positive and negative clock edges.

The clock input circuit 218 receives the true clock signal (Clk_t) and the complementary clock signal (Clk_c) and generates an internal clock signal CLK, which is supplied to the TSV I/O interface 216, for instance, and is used as a timing signal for determining an output timing of read data. The internal clock signal CLK may also be provided to various other components within the dies 106 and may be used to generate various additional internal clock signals. For instance, the internal clock signal CLK may be provided to a command decoder 232. The command decoder 232 may receive command signals from a command bus 234 and may decode the command signals to provide various internal commands. The command decoder 232 may also provide command signals to the TSV I/O interface 216 over a bus 237 to facilitate receiving and transmitting I/O signals. The clock signal CLK may also be used to clock data through the TSV I/O interface 216, for instance.

Further, the command decoder 232 may decode commands received from the command bus 234, such as read commands, write commands, mode-register set commands, activate commands, etc., and provide access to a particular memory bank 212 corresponding to the command, via the bus path 240. As will be appreciated, the dies 106 may include various other decoders, such as row decoders and column decoders, to facilitate access to the memory banks 212. In one embodiment, each memory bank 212 includes a bank control block 222 which provides the necessary decoding (e.g., row decoder and column decoder), as well as other features, such as timing control and data control, to facilitate the execution of commands to and from the memory banks 212. A group of the memory banks 212 may be included in a memory channel 223, and the dies 106 may include one or more channels.

The dies 106 execute operations, such as read commands and write commands, based on the command/address signals received from the interface die 104. In one embodiment, the command/address bus may be a 14-bit bus to accommodate the command/address signals (CA<13:0>). The command/address signals are clocked to the command interface 214 using the clock signals (Clk_t and Clk_c). The command/address input circuit 220 in the command interface 214 may receive and transmit the commands to provide access to the memory banks 212, through the command decoder 232, for instance. In addition, the command interface 214 may receive a chip select signal (CS_n). The chip select signal CS_n enables the dies 106 to process commands on the incoming command/address signals CA<13:0> for the memory chip selected by the chip select signal CS_n. Accordingly, access to specific banks 212 within the dies 106 is facilitated by the information encoded on the chip select signal CS_n and the command/address signals CA<13:0>.

In addition, the command interface 214 may receive a number of other command signals. For instance, a reset command (RESET_n) may be used to reset the command interface 214, status registers, state machines and the like, during power-up for instance. The command interface 214 may also be used to provide an alert signal (ALERT_n) to the system processor or controller for certain errors that may be detected. For instance, an alert signal (ALERT_n) may be transmitted from the dies 106 if a cyclic redundancy check (CRC) error is detected. Other alert signals may also be generated. Further, the bus and pin for transmitting the alert signal (ALERT_n) from the dies 106 may be used as an input pin during certain operations, such as the connectivity test mode executed using the TEN signal, as described above.

Data may be sent to and from the dies 106, utilizing the command and clocking signals discussed above, by transmitting and receiving data signals 244 through the TSV I/O interface 216. More specifically, the data may be sent to or retrieved from the memory banks 212 over the data bus 246, which includes a plurality of bi-directional data buses. The Data I/O signals, generally referred to as DQ signals, are generally transmitted and received in one or more bi-directional data busses. In certain embodiments, an error correction code (ECC) system 248 may be used to detect, and in some cases, resolve, data errors that may arise. For example, incorrect bits may be retrieved via a memory read command and the ECC system 248 may detect, and in some cases correct, the read data. The ECC system 248 may additionally raise a flag if, for example, correction may not be possible.

To allow for higher data rates within the dies 106, certain memory devices, such as HBM memory devices, may utilize data strobe signals, generally referred to as DQS signals. The DQS signals are driven by the external processor or controller sending the data (e.g., for a write command) or by the dies 106 (e.g., for a read command). For read commands, the DQS signals are effectively additional data output (DQ) signals with a predetermined pattern. For write commands, the DQS signals are used as clock signals to capture the corresponding input data. As with the clock signals (Clk_t and Clk_c), the data strobe (DQS) signals may be provided as a differential pair of data strobe signals (DQS_t and DQS_c) to provide differential pair signaling during reads and writes.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the dies 106), etc., may also be incorporated into the dies 106. Accordingly, it should be understood that the block diagram of FIG. 3 is only provided to highlight certain functional features of the dies 106 to aid in the subsequent detailed description.

As discussed above, data may be written to and read from the dies 106, for example, by the primary host device 120 whereby the dies 106 operate as volatile memory, such as HBM memory. The primary host device 120 may, in some embodiments, also include separate non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) as well as other types of memory devices (e.g., storage), such as solid state drives (SSD's), MultimediaMediaCards (MMC's), SecureDigital (SD) cards, CompactFlash (CF) cards, or any other suitable device. Further, it should be appreciated that the primary host device 120 may include one or more external interfaces, such as Universal Serial Bus (USB), Peripheral Component Interconnect (PCI), PCI Express (PCI-E), Small Computer System Interface (SCSI), IEEE 1394 (Firewire), or any other suitable interface as well as one or more input devices to allow a user to input data into the primary host device 120, for example, buttons, switching elements, a keyboard, a light pen, a stylus, a mouse, and/or a voice recognition system, for instance. The primary host device 120 may optionally also include an output device, such as a display coupled to the processor and a network interface device, such as a Network Interface Card (NIC), for interfacing with a network, such as the Internet. As will be appreciated, the primary host device 120 may include many other components, depending on the application of the primary host device 120.

Figure 4:
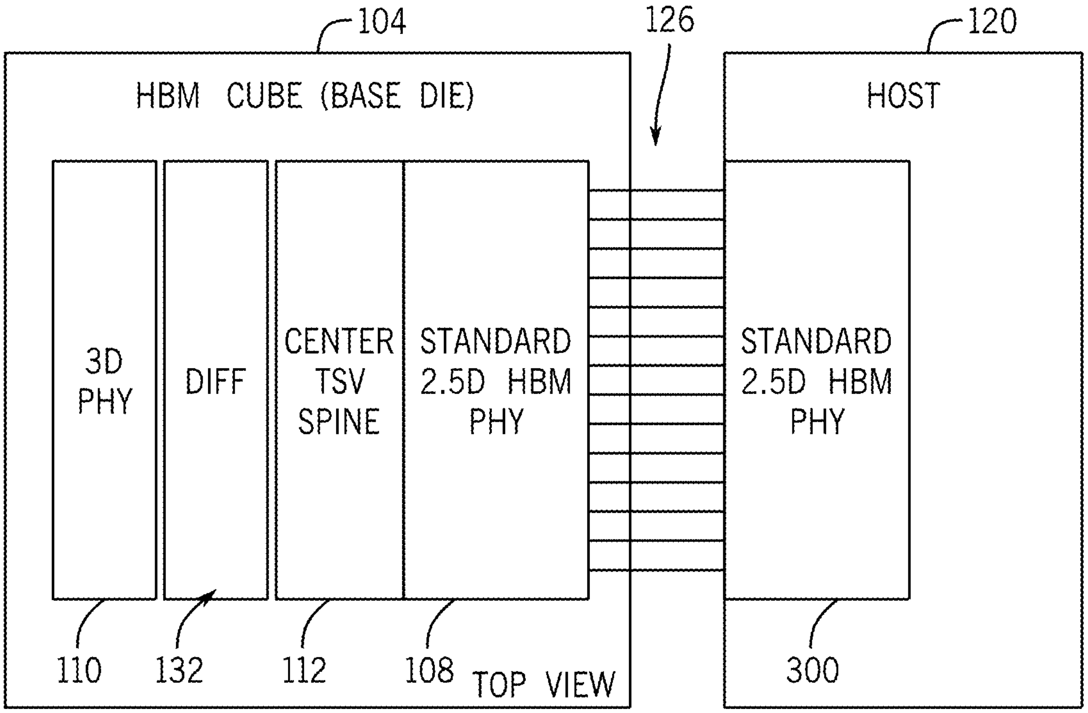
FIG. 4 is a simplified block diagram illustrating a connection between the memory device and the host device of FIG. 1, according to an embodiment of the present disclosure.

FIG. 4 is a simplified block diagram illustrating an embodiment of the connection between the memory device 102 and the primary host device 120, in which the memory device 102 may be coupled to the primary host device 120 via the 2.5D PHY 108 of the interface die 104. As illustrated in FIG. 4, the primary host device 120 may include a 2.5D PHY 300 that may be coupled to the 2.5D PHY 108 of the interface die 104 (e.g., via the channels 126 of the interposer 122). The primary host device 120 may communicate with the memory device 102 via the 2.5D PHY 300 and the 2.5D PHY 108. For example, commands or operations from the primary host device 120 may be transmitted to the 2.5D PHY 108 via the 2.5D PHY 300, such as read or write operations to transfer data (e.g., user data and associated integrity data, such as error data or address data, etc.), erase operations to erase data, or drive management operations (e.g., data migration, garbage collection, block retirement), etc. The commands or operations received by the 2.5D PHY 108 may be transmitted to the dies 106 via the TWIs 112. Each of the dies 106 (e.g., die 1, die 2 . . . ) may include interface circuitry to communicate with the interface die 104, as illustrated in FIG. 3. Corresponding data may be transmitted inside the memory device 102 between the dies 106 and the 2.5D PHY 108 via the TWIs 112 and the channels 130, and the corresponding data may be transmitted between the memory device 102 and the primary host device 120 via the 2.5D PHY 108 and the 2.5D PHY 300. In the embodiment illustrated in FIG. 4, the 3D PHY 110 may not be used for the communication between the memory device 102 and the primary host device 120.

Figure 5:
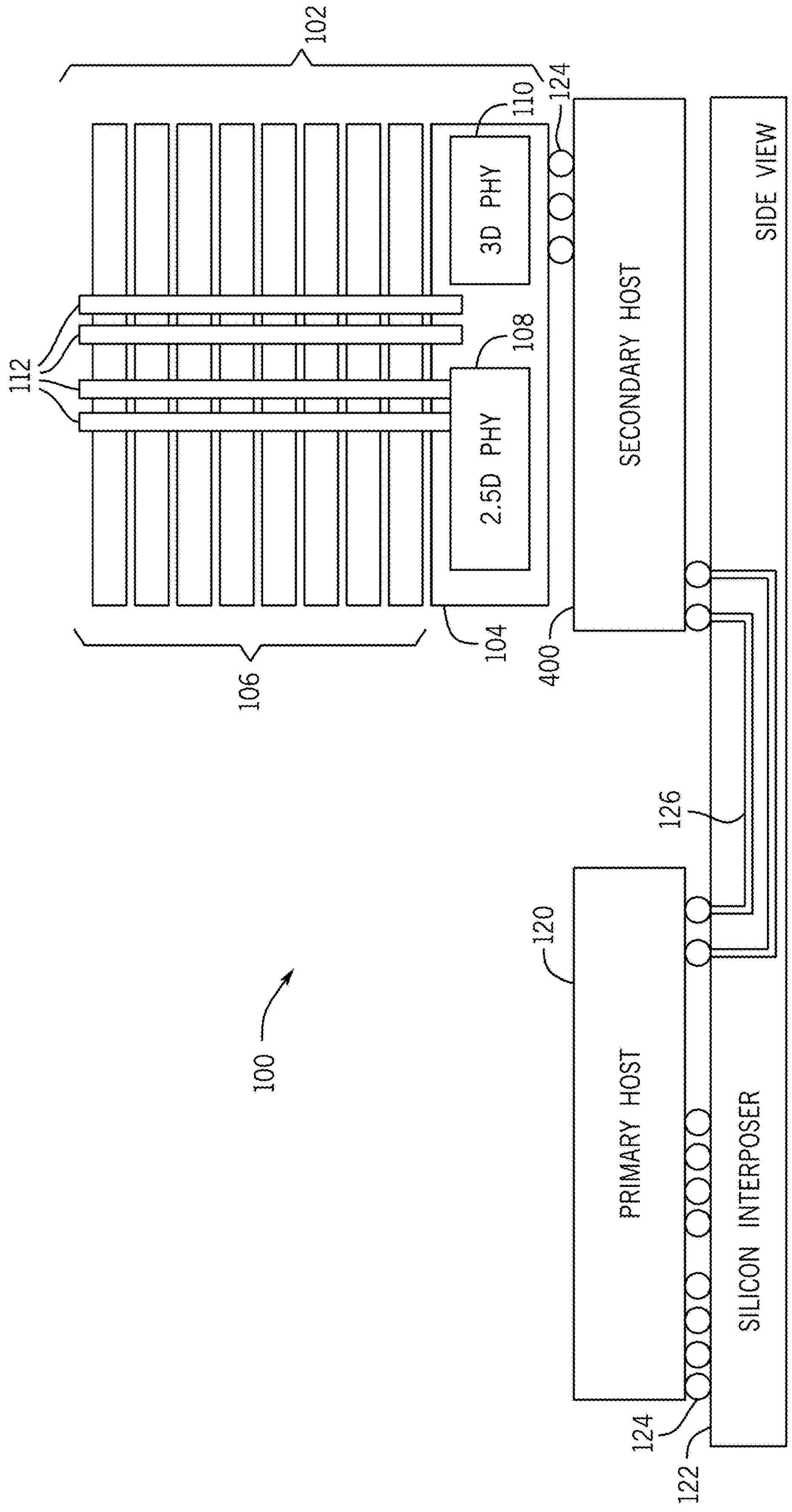
FIG. 5 is a cross-section of a second embodiment of the system of FIG. 1, according to an embodiment of the present disclosure.

FIG. 5 is a cross-section of a second embodiment of the system 100. Although one memory device is shown for the depicted example, a number of memory devices greater than one may be used. In the embodiment illustrated in FIG. 5, the memory device 102 may be communicatively coupled to a secondary host device 400 via the 3D PHY 110 of the interface die 104 (e.g., via a number of micro-bumps 124), and the secondary host 400 may be communicatively coupled to the primary host device 120 via the interposer 122 (e.g., through the channels 126). The secondary host device 400 may include a customized communication interface (not shown in FIG. 5), and the 3D PHY 110 of the interface die 104 may be adaptable to the customized communication interface of the secondary host device 400 so that the 3D PHY 110 may be used for communications between the memory device 102 and the secondary host device 400. In addition, the secondary host device 400 may include interface circuitry, which is adaptable to a predefined communication interface of the primary host device 120, to communicate with the primary host 120 through the interposer 122. The interposer 122 may include channels 126 that may be used to communicatively couple the primary host device 120 with the secondary host device 400 via corresponding micro-bumps 124. Although only two channels 126 are shown in FIG. 5, greater or fewer numbers of channels 126 may be used.

In FIG. 5, the memory device 102 may receive commands or operations from the secondary host device 400 via the 3D PHY 110, such as read or write operations to transfer data (e.g., user data and associated integrity data, such as error data or address data, etc.) between the memory device 102 and the secondary host device 400, erase operations to erase data from the memory device 102, or drive management operations (e.g., data migration, garbage collection, block retirement), etc. The primary host device 120 may communicate with the secondary host device 400 through the channels 126. Accordingly, in the embodiment illustrated in FIG. 5, the 3D PHY 110 of the memory device 102 may be coupled with the customized communication interface of the secondary host device 400 for the communication between the memory device 102 and the secondary host device 400, as well as the primary host device 120.

In some embodiments, the secondary host 400 may be used for testing the memory device 102 by using the interface circuitry that are adaptable to the predefined communication interface of the primary host device 120. In some embodiments, it might be desirable to test the memory device 102 without coupling the 3D PHY 110 to the customized communication interface of the secondary host device 400, and the 2.5D PHY 108 of the interface die 104 may be used for testing the memory device 102. For example, the secondary host device 400 may be unavailable when testing the memory device 102. In some embodiments, once the 3D PHY 110 is coupled to the secondary host device 400, it might be undesirable or difficult to decouple the 3D PHY 110 from the secondary host device 400. Accordingly, it may be desirable to test the memory device 102 without coupling the 3D PHY 110 to the customized communication interface of the secondary host device 400. Therefore, it may be desired to include both the 2.5D PHY 108 and the 3D PHY 110 on the interface die 104 of the memory device 102.

Figure 6:
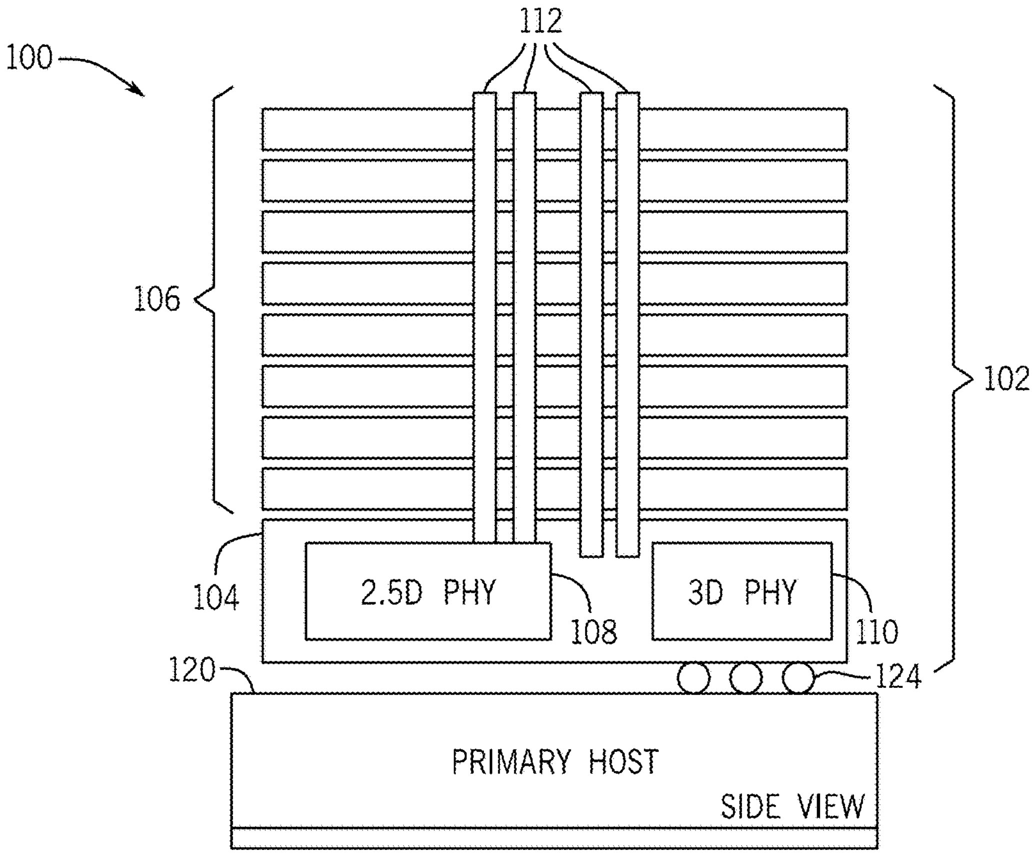
FIG. 6 is a cross-section of a third embodiment of the system of FIG. 1, according to an embodiment of the present disclosure.

FIG. 6 is a cross-section of a third embodiment of the system 100. Although one memory device is shown for the depicted example, a number of memory devices greater than one may be used. In the embodiment illustrated in FIG. 6, the memory device 102 may be communicatively coupled to the primary host device 120 through the 3D PHY 110 (e.g., via a number of micro-bumps 124). The primary host device 120 may include a customized communication interface (not shown in FIG. 6), and the 3D PHY 110 of the interface die 104 may be adaptable to the customized communication interface so that the 3D PHY 110 may be used for communications between the memory device 102 and the primary host device 120. The memory device 102 may receive commands or operations from the primary host device 120 via the 3D PHY 110, such as read or write operations to transfer data (e.g., user data and associated integrity data, such as error data or address data, etc.) between the memory device 102 and the primary host device 120, erase operations to erase data from the memory device 102, or drive management operations (e.g., data migration, garbage collection, block retirement), etc.

In some embodiments, it might be desirable to test the memory device 102 without coupling the 3D PHY 110 to the customized communication interface of the primary host device 120, and the 2.5D PHY 108 of the interface die 104 may be used for testing the memory device 102. For example, the primary host device 120 may be unavailable when testing the memory device 102. In some embodiment, once the 3D PHY 110 is coupled to the primary host device 400, it might be undesirable or difficult to decouple the 3D PHY 110 from the primary host device 120. Accordingly, it may be desirable to test the memory device 102 without coupling the 3D PHY 110 to the customized communication interface of the primary host device 120. Therefore, it may be desired to include both the 2.5D PHY 108 and the 3D PHY 110 on the interface die 104 of the memory device 102.

Figure 7:
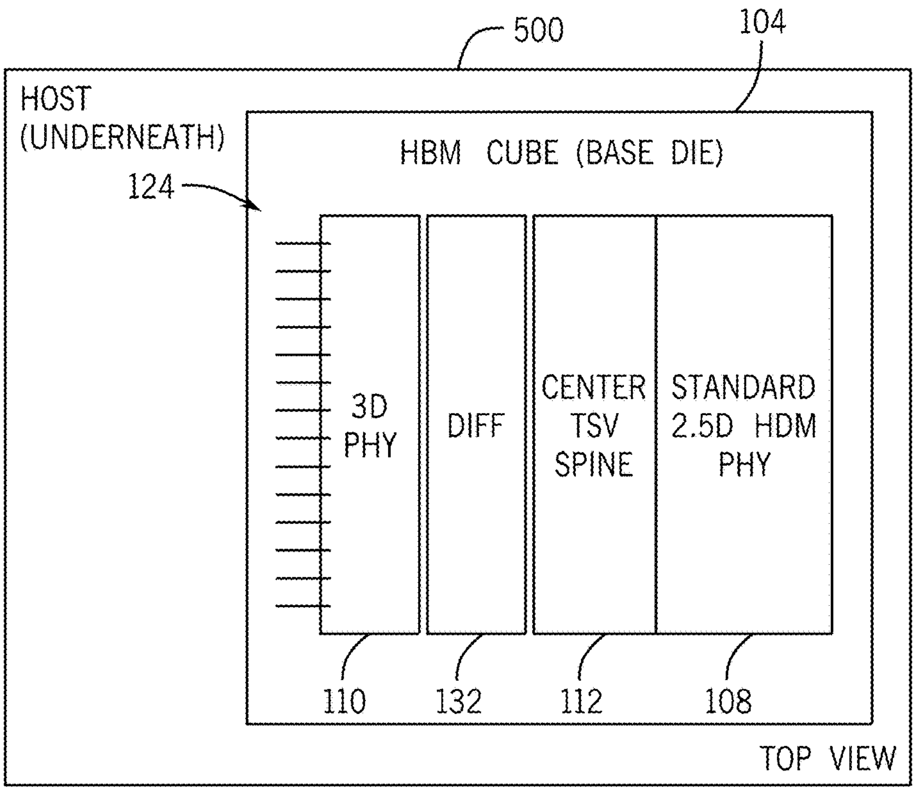
FIG. 7 is a simplified block diagram illustrating a connection between the memory device and the host device of FIG. 5 and FIG. 6, according to an embodiment of the present disclosure.

FIG. 7 is a simplified block diagram illustrating the memory device 102 coupled to a host device 500 (e.g., the secondary host device 400 in FIG. 5, the primary host device 120 in FIG. 6) via the 3D PHY 110 of the interface die 104. As illustrated in FIG. 7, the 3D PHY 110 of the interface die 104 may be communicatively coupled to the host device 500 underneath via a number of micro-bumps 124. The host device 500 may include a customized communication interface (not shown in FIG. 7) to communicate with the memory device 102 via the 3D PHY 110. For example, commands or operations from the host device 500 may be transmitted to the 3D PHY 110 via the customized communication interface of the host device 500, such as read or write operations to transfer data (e.g., user data and associated integrity data, such as error data or address data, etc.), erase operations to erase data, or drive management operations (e.g., data migration, garbage collection, block retirement), etc. The commands or operations received by the 3D PHY 110 may be transmitted to the dies 106 via the DIFF 132 and the TWIs 112. Each of the dies 106 (e.g., die 1, die 2 . . . ) may include interface circuitry to communicate with the interface die 104, as illustrated in FIG. 3. Corresponding data may be transmitted inside the memory device 102 between the dies 106 and the 3D PHY 110 via the TWIs 112 and the DIFF 132, and the corresponding data may be transmitted between the memory device 102 and the host device 500 via the 3D PHY 110. In the embodiment illustrated in FIG. 7, the 2.5D PHY 108 may not be used for the communication between the memory device 102 and the host device 500.

Accordingly, the technical effects of the present disclosure include methods and systems for using a 2.5 D PHY and a 3D PHY for communications between a memory device and a host device. The memory device may include a 2.5D PHY for communications with the host device through a predefined communication interface and a 3D PHY for communications with the host device through a customized communication interface. In addition, the 2.5D PHY of the memory device may be used for communications through the predefined communication interface when the customized communication interface is not available or undesired (e.g., during testing of the memory device).

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. An apparatus, comprising:
one or more memory dies; and
an interface die comprising:
a 2.5D PHY communicatively coupled to the one or more memory dies via Through-Wafer Interconnects (TWIs), wherein the 2.5D PHY is configured to communicate with a host device via a predefined communication interface; and
a 3D PHY communicatively coupled to the one or more memory dies via the TWIs, wherein the 3D PHY is configured to communicate with the host device via a customized communication interface corresponding to a customized arrangement of one or more circuits.

2. The apparatus of claim 1, wherein the 3D PHY is communicatively coupled to the TWIs via a DRAM Interface Fabric (DIFF).

3. The apparatus of claim 1, wherein each of the one or more memory dies comprises respective interface circuitry to communicate with the interface die via the TWIs.

4. The apparatus of claim 1, wherein the 2.5D PHY is configured to be used for testing the apparatus before the apparatus is coupled to the host device via the 3D PHY.

5. The apparatus of claim 1, wherein the 2.5D PHY is communicatively coupled to the host device via an interposer.

6. The apparatus of claim 1, wherein the 3D PHY is communicatively coupled to the host device via a secondary host device, and wherein the secondary host device comprises the customized communication interface.

7. The apparatus of claim 6, wherein the secondary host device is configured to be used for testing the apparatus.

8. The apparatus of claim 1, wherein the 3D PHY is communicatively coupled to the host device via a plurality of micro-bumps, and wherein the host device comprises the customized communication interface.

9. An interface die of a memory device, comprising:
a 2.5D PHY communicatively coupled to one or more dies of the memory device via Through-Wafer Interconnects (TWIs), wherein the 2.5D PHY is configured to communicate with a host device via a predefined communication interface; and
a 3D PHY communicatively coupled to the one or more dies via the TWIs, wherein the 3D PHY is configured to communicate with the host device via a customized communication interface corresponding to a customized arrangement of one or more circuits.

10. The interface die of claim 9, wherein the 3D PHY is communicatively coupled to the TWIs via a DRAM Interface Fabric (DIFF).

11. The interface die of claim 9, wherein each of the one or more dies comprises respective interface circuitry to communicate with the interface die via the TWIs.

12. The interface die of claim 9, wherein the 2.5D PHY is configured to be used for testing the memory device before the memory device is coupled to the host device via the 3D PHY.

13. The interface die of claim 9, wherein the 2.5D PHY is communicatively coupled to the host device via an interposer.

14. The interface die of claim 9, wherein the 3D PHY is communicatively coupled to the host device via a secondary host device, and wherein the secondary host device comprises the customized communication interface.

15. The interface die of claim 14, wherein the secondary host device is configured to be used for testing the memory device.

16. The interface die of claim 9, wherein the 3D PHY is communicatively coupled to the host device via a plurality of micro-bumps, and wherein the host device comprises the customized communication interface.

17. Interface circuitry of a memory device, comprising:

a 2.5D PHY configured to communicate with a host device via a predefined communication interface; and a 3D PHY configured to communicate with the host device via a customized communication interface corresponding to a customized arrangement of one or more circuits.

18. The interface circuitry of claim 17, wherein the 2.5D PHY is configured to be used for testing the memory device before the memory device is coupled to the host device via the 3D PHY.

19. The interface circuitry of claim 17, wherein the 3D PHY is communicatively coupled to the host device via a secondary host device, and wherein the secondary host device comprises the customized communication interface.

20. The interface circuitry of claim 19, wherein the secondary host device is configured to be used for testing the memory device.

21. The interface die of claim 9, wherein the one or more circuits comprises at least one circuit that is external to the memory device.

* * * * *